Dec. 13, 1955     D. A. MUIRHEAD     2,726,785
CAN OPENING KEY HOLDER AND ACTUATOR
Filed July 20, 1953
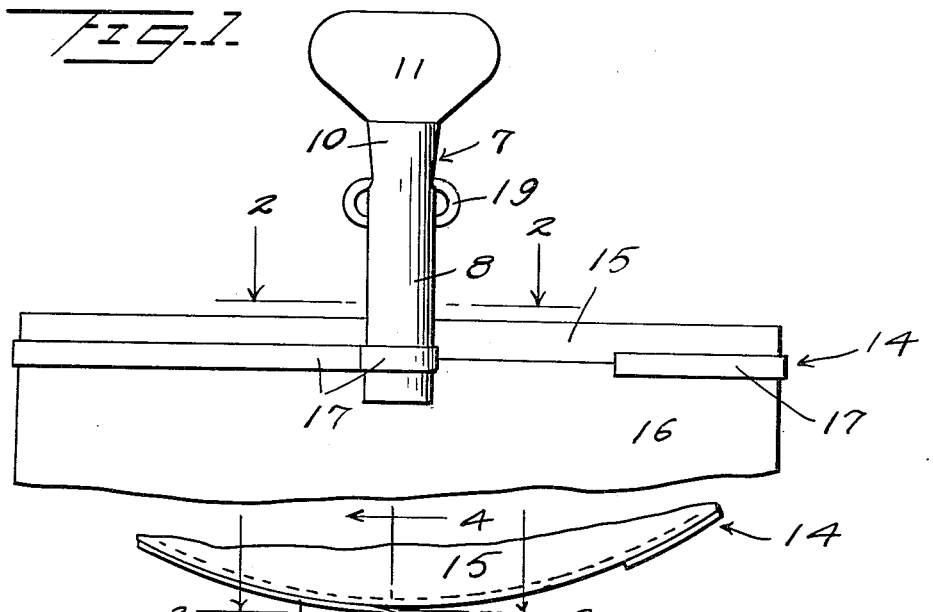
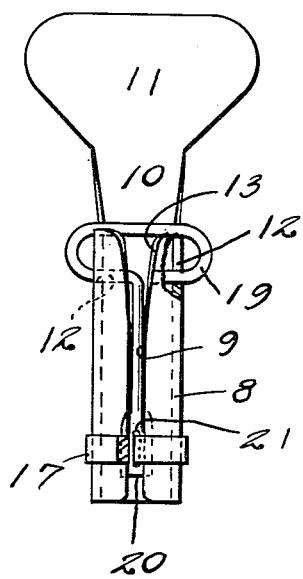
INVENTOR
*Donald A. Muirhead*
BY *John N. Randolph*
ATTORNEY

United States Patent Office 2,726,785
Patented Dec. 13, 1955

2,726,785

CAN OPENING KEY HOLDER AND ACTUATOR

Donald A. Muirhead, Seattle, Wash.

Application July 20, 1953, Serial No. 368,988

3 Claims. (Cl. 220—52)

This invention relates to a novel key holder and actuator for use with a conventional key of the type employed to open cans and more particularly of the type conventionally supplied with vacuum sealed cans which are opened by utilizing the key to wind the sealing strip of the can thereon for detaching the sealing strip from the can.

More particularly, it is an aim of the present invention to provide a key holder and actuator which may be readily applied to a conventional can sealing strip removing key after engagement of the sealing strip by the key for much more quickly removing the sealing strip and to minimize the possibility of the wound sealing strip spreading lengthwise of the key while being unwound from the can, as frequently occurs in the employment of a conventional key.

Another object of the invention is to provide a key holder and actuator which may be readily removed from the wound sealing strip and key after the sealing strip has been detached from the can, to enable the holder and actuator to be used indefinitely.

A further object of the invention is to provide a holder and actuator which will materially lessen the labor involved in removing a sealing strip from a can and will enable the operation to be performed much more rapidly.

Various other objects and advantages of the invention will hereinafter become more fully apparent from the following description of the drawing, illustrating a presently preferred embodiment thereof, and wherein:

Figure 1 is a side elevational or plan view looking toward the outer side of the holder and actuator and showing the holder and actuator in an operative position;

Figure 2 is an enlarged cross sectional view taken substantially along a plane as indicated by the line 2—2 of Figure 1;

Figure 3 is an elevational view, partly in section, looking toward the inner side of the holder and actuator and taken substantially along a plane as indicated by the line 3—3 of Figure 2;

Figure 4 is a longitudinal sectional view of the holder and actuator taken substantially along a plane as indicated by the line 4—4 of Figure 2, and Figure 5 is a side elevational view partly broken away of the actuator and holder only looking from left to right of Figure 3.

Referring more specifically to the drawing, the winding key holder and actuator comprising the invention is designated generally 7 and is preferably formed from a single strip of relatively rigid metal one end of which is relatively wide and transversely rolled to form a cylinder 8, the side edges of which ends are disposed in spaced apart relationship to one another to provide a slot 9 which extends from end-to-end of said cylinder 8. The holder and actuator 7 is provided with a substantially flat shank 10 forming an integral extension of a portion of the inner end of the cylinder 8. The slot 9 is disposed substantially diametrically opposite to the shank 10. The opposite end of the holder and actuator 7 constitutes a handle 11 formed by a laterally flared extension of the end of the shank 10 located remote to the cylinder 8. The inner end of the cylinder 8 is provided with diametrically opposed outwardly opening notches 12 which are disposed between the slot 9 and shank 10 and spaced substantially equal distances therefrom. As best seen in Figure 3, the slot 9 increases in width adjacent the inner end of the cylinder 8, as indicated at 13.

Figure 1 illustrates a portion of the upper end of a conventional vacuum sealed can 14 of the type conventionally employed for containing coffee, tobacco or the like and which includes a flanged cap or cover 15 which is sealed to the upper end of the can body 16 by a conventional sealing strip or band 17 which seals the joint between the can body and cover. A conventional sealing strip removing key 18 is ordinarily furnished with the can 14 and is usually soldered thereto so that it can be readily removed for use. The key 18 is formed of a strand of wire and one end of which is bent to provide a relatively large laterally disposed loop 19 forming the key handle and the other end of which is flattened as seen at 20 and provided with a longitudinally extending slot 21. The sealing band or strip 17 is conventionally provided with an overlapping unsecured end. When the can 14 is to be opened and after the key 18 has been detached from the can, the overlapping unsecured end of the sealing strip or band 17 is bent outwardly to extend radially away from the can and so that it can be engaged through the slot 21 of the key 18. The key is positioned to extend upwardly and so that the handle 19 thereof will be disposed above the can lid 15.

Instead of turning the key sufficiently to wind the entire sealing strip 17 thereon and to unwind and tear the sealing strip from the can body 16 and lid 15 as the key 18 travels clockwise around the can 14, as seen in Figure 2, the key 18 is turned only sufficiently to wind the strip 17 once or twice around its flattened end 20 after the outwardly bent unsecured end 22 of the sealing strip has been engaged through the slot 21. The key 18 is then turned one-half or one turn in the opposite direction to displace the key 18 away from the can 14 and so that the handle 19 will be disposed substantially parallel to the can portion located adjacent the key 18.

The holder and actuator is then positioned with the cylinder 8 below the key 18 and with the slot 9 facing inwardly toward the can 14. The holder and actuator 7 is then displaced upwardly causing the flattened end 20 of the key to enter the inner or upper end of the cylinder 8 and the band portion 17 which extends from the key to enter the flared upper or inner end 13 of the slot and then pass downwardly through the slot to adjacent the lower end of the cylinder 8. As the flattened end 20 of the key approaches the lower outer end of the cylinder 8 the end portions of the key loop or handle 19 will be engaged in the notches 12 for nonrotatably connecting the holder and actuator 7 to the key 18. The handle 11 is then grasped with the fingers for rotating the holder 7 and to cause said holder to travel clockwise around the can 14 as seen in Figure 2 for tearing the sealing strip 17 therefrom and for winding the sealing strip clockwise about the cylinder 8.

In view of the relatively large diameter of the cylinder 8 as compared to the key end 20, the sealing strip 17 will be much more rapidly torn from the can 14 and wound on the cylinder 8 than if said strip were removed in the conventional manner with the key 18. Furthermore, the number of convolutions required to wind the strip 17 on the cylinder 8 for completely detaching the strip from the can 14 will be materially less than the number required if the strip were wound on the key end 20. Consequently, the tendency of the wound convolutions of the sealing strip to spread longitudinally will be substantially eliminated. This frequently occurs in winding a sealing strip on a conventional key 18 making it very difficult to complete the removal of the sealing strip. Furthermore, the size of the actuator 7 will enable it to be much more readily rotated for tearing the sealing strip 17 from the can 14.

After the sealing strip has been removed from the can 14 and is wound on the cylinder 8, said strip is grasped between the fingers and the actuator 7 is rotated by its handle 11 in the opposite direction for loosening the convolutions of the wound strip 17 so that said strip may be slipped off of the lower or outer end of the cylinder 8 and the portion of said strip extending outwardly through the slot 9 may then slide upwardly or inwardly of said slot for completely removing the sealing strip 17 and key 18 from the holder and actuator 7. The key 18 and sealing strip 17 are then disposed of. However, the holder and actuator 7 is obviously adapted to be used repeatedly for accomplishing the removal of sealing strips, as just previously described and which operation may obviously be performed much more rapidly and with much less physical effort when using the holder and actuator 7 than in the conventional manner, utilizing the key 18 alone.

Various modifications and changes are contemplated and may obviously be resorted to, without departing from the spirit or scope of the invention as hereinafter defined by the appended claims.

I claim as my invention:

1. A sealing strip remover comprising a key holder and actuator including a cylinder-like portion constituting one end of the holder and actuator and having a slot extending from end-to-end thereof, a shank portion forming an extension of an inner end of said cylinder-like portion and circumferentially spaced from the cylinder slot, said shank terminating at its opposite end in a handle adapted to be manually engaged for revolving said cylinder-like portion, said inner end of the cylinder-like portion having oppositely disposed notches opening outwardly thereof and disposed between said slot and shank, a sealing strip removing key including a shank loosely fitting in the cylinder-like portion and having a distal end provided with an elongated slot, said key having a transversely elongated handle loop forming an extension of the opposite end of the shank, portions of the handle loop engaging in said notches for supporting the key shank nonrotatably in said cylinder-like portion, said key shank slot receiving a terminal portion of a sealing strip which is anchored to the key shank and a part of which strip extends through the slot of said cylinder-like portion, and said holder and actuator being rotated about its longitudinal axis with the key supported therein and rotated therewith for winding the remainder of the sealing strip around the cylinder-like portion for tearing the strip from a can sealed thereby.

2. A sealing strip remover as in claim 1, said slot being substantially straight from end-to-end thereof and tapering toward an outer end of the cylinder-like portion and having a flared mouth at the inner end of said cylinder-like portion.

3. A sealing strip remover of the character described comprising a cylinder-like portion having a slot extending from end-to-end thereof, said portion constituting one end of a holder and actuator and, a sealing strip removing key having a shank loosely disposed in said cylinder-like portion to which an end of a sealing strip is anchored, a portion of the sealing strip extending outwardly through said slot from the key shank, a handle forming the other end of said holder and actuator, and a shank extending between and connecting said handle and an inner end of said cylinder-like portion, said inner end of the cylinder-like portion being provided with oppositely disposed outwardly opening notches, said key having a handle loop fixed to one end of the key shank and engaging in said notches for non-turnably supporting the key in said cylinder-like portion for rotation of the key with the holder and actuator, said notches being disposed between and spaced from said slot and shank of the holder and actuator.

References Cited in the file of this patent

UNITED STATES PATENTS

| 1,692,213 | Kielberg | Nov. 20, 1928 |

FOREIGN PATENTS

| 260,157 | Great Britain | Oct. 28, 1926 |
| 850,255 | France | Sept. 4, 1939 |